No. 608,259. Patented Aug. 2, 1898.
E. H. HEVERLY.
WINDOW SHELF.
(Application filed June 30, 1897.)
(No Model.)
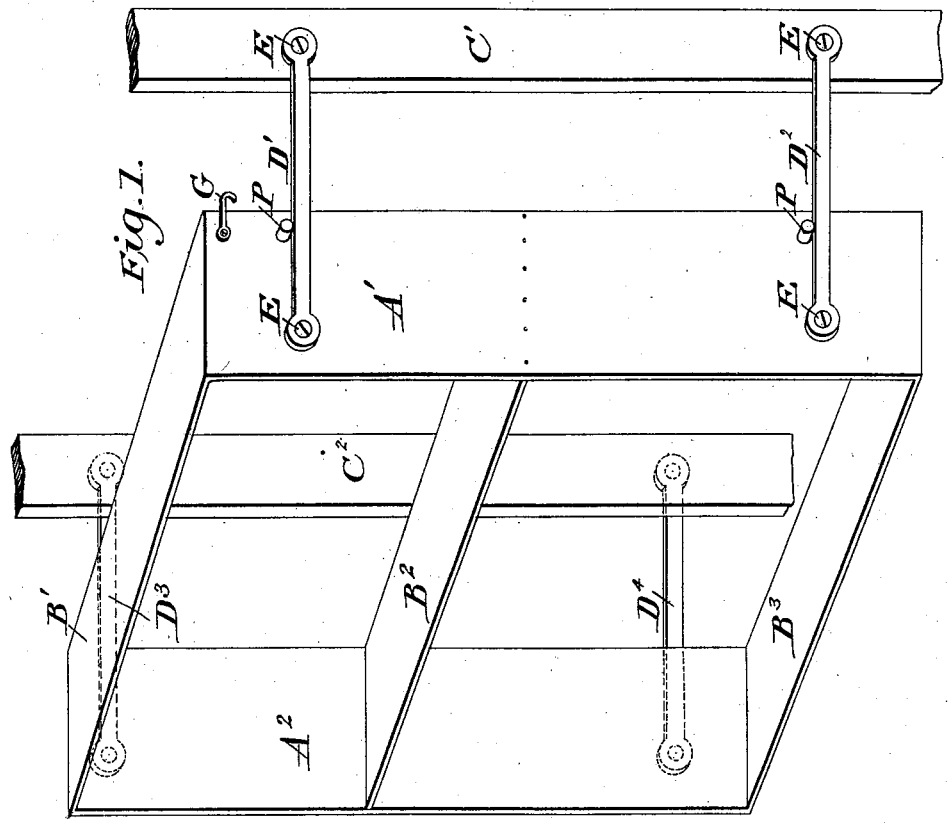
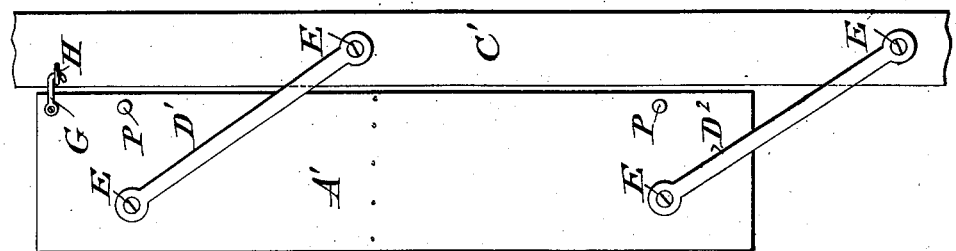
Witnesses.
Ada B Hearn
Rena E. Randle.
Inventor.
Edward H Heverly
per
Robert W Randle
Attorney.

United States Patent Office.

EDWARD H. HEVERLY, OF CENTRE POINT, IOWA.

WINDOW-SHELF.

SPECIFICATION forming part of Letters Patent No. 608,259, dated August 2, 1898.

Application filed June 30, 1897. Serial No. 642,926. (No model.)

*To all whom it may concern:*

Be it known that I, EDWARD H. HEVERLY, a citizen of the United States, residing at Centre Point, in the county of Linn and State of Iowa, have invented certain new and useful Improvements in Window-Shelves; and I do declare the following to be a full, clear, and exact description, reference being had to the accompanying drawings, forming a part thereof, and to the letters marked thereon, such as will enable others skilled in the art to which it appertains to make and use the same.

My invention relates to improvements in adjustable shelving, and more especially to that class designed for window-shelving in which a section of shelving is adapted to be drawn away from or to be secured back to or against the window-casing, as desired; and the objects of my improvements are, first, to provide a set of window-shelves that can be easily and quickly attached or detached and without marring the window-casing; second, to provide window-shelving that can be easily constructed and at a very small cost, and, third, to provide a set of window-shelving that can be secured as near to the window as possible and that can be drawn away from the window when there is danger from frost to the plants that may be on the shelves. I attain these objects by the mechanism illustrated in the accompanying drawings, in which—

Figure 1 is a view in perspective of the entire device. Fig. 2 is an end view of the device.

Similar letters refer to similar parts throughout both views.

The upright end pieces $A'$ and $A^2$, provided with three shelves $B'$, $B^2$, and $B^3$, constitute the framework of the device. Two arms are provided on each side of this frame, one near the top and one near the bottom. These arms $D'$ $D^2$ $D^3$ $D^4$ are flattened at the ends and are secured to the end pieces $A'$ $A^2$ and to the window-casing C by means of screws or bolts E. When the arms D are horizontal, the frame is secured in that position by the coming in contact of arms $D'$ $D^2$ $D^3$ $D^4$ with the stationary pins or projections P, and the shelving is thus held in position away from the window. By pushing against and up on the shelving the end pieces are brought in contact with the casing of the window and are secured in that position by means of hooks G on either side of the shelving, (at top or in the center, as preferred or convenient,) hooking into the eyes H on the casing of the window. When thus secured, flowers or plants can be placed on the shelving, and should there be danger of the plants being frosted the hooks G can be detached from eyes H and the whole case of plants drawn away from the window, as shown in Fig. 1. The window-blind can then be pulled down between the shelving and window, thereby protecting the plants. When the danger of frost is over, they can again be placed nearer the window, as shown in Fig. 2.

Having thus described my invention, what I claim, and desire to secure by Letters Patent, is—

The combination of a set of shelves with two or more pivoted arms on each side, whereby they may be attached to a window-casing, hooks for securing them in their uppermost position, and pins whereby they are prevented from falling below a certain point, all substantially as described.

In testimony whereof I affix my signature in presence of two witnesses.

EDWARD H. HEVERLY.

Witnesses:
J. J. HEVERLY,
S. F. HEVERLY.